Figure 1:
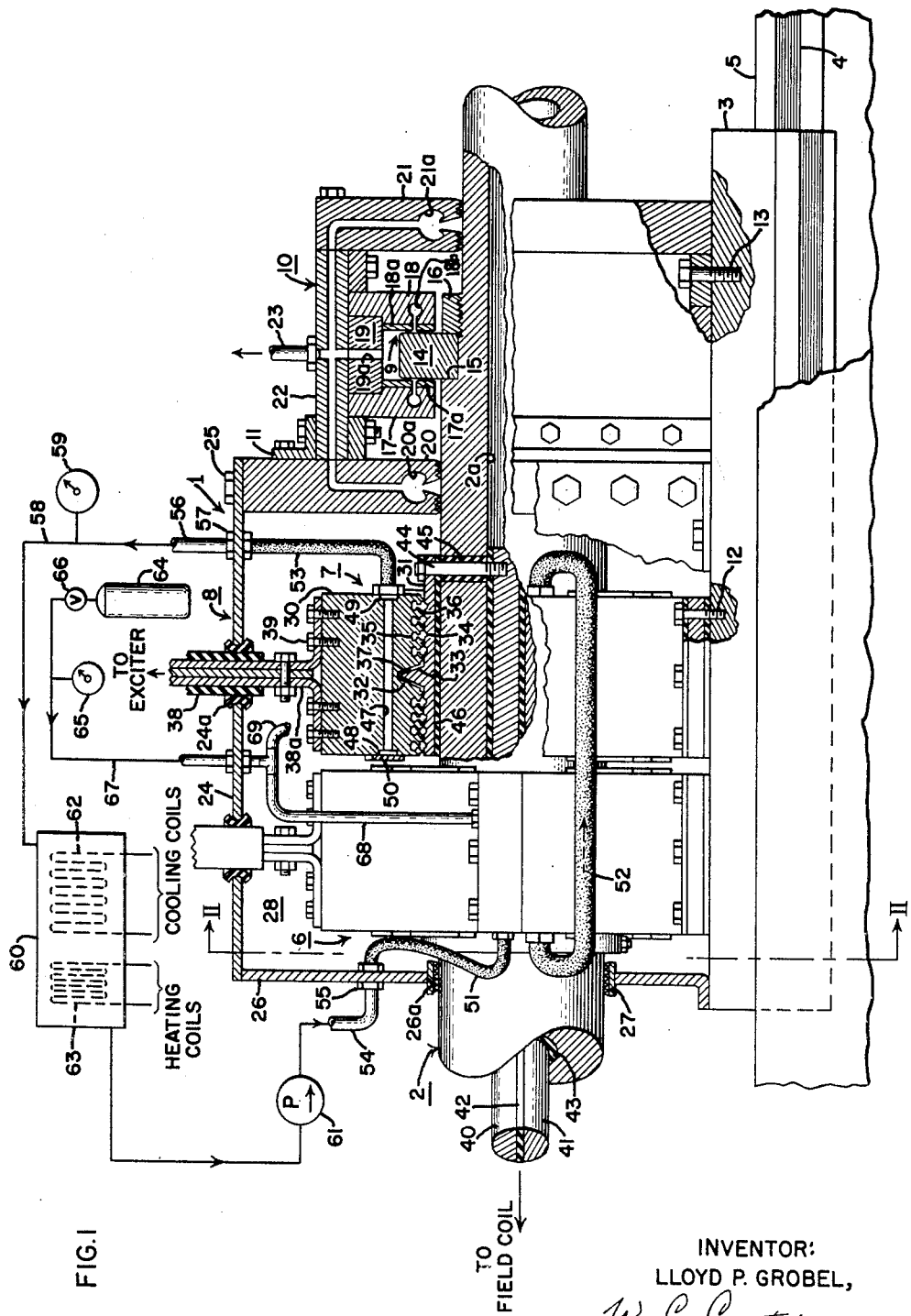

Feb. 2, 1965

L. P. GROBEL 3,168,666

DYNAMOELECTRIC MACHINE ELECTRICAL COLLECTOR
ASSEMBLY USING LIQUID METAL

Filed Dec. 26, 1962

5 Sheets-Sheet 1

INVENTOR:
LLOYD P. GROBEL,
BY W. C. Crutcher
HIS ATTORNEY.

INVENTOR:
LLOYD P. GROBEL,

BY *W. C. Crutcher*

HIS ATTORNEY.

Feb. 2, 1965 L. P. GROBEL 3,168,666
DYNAMOELECTRIC MACHINE ELECTRICAL COLLECTOR
ASSEMBLY USING LIQUID METAL
Filed Dec. 26, 1962 5 Sheets-Sheet 5

INVENTOR:
LLOYD P. GROBEL,
BY W. C. Crutcher
HIS ATTORNEY.

United States Patent Office 3,168,666
Patented Feb. 2, 1965

3,168,666
DYNAMOELECTRIC MACHINE ELECTRICAL COLLECTOR ASSEMBLY USING LIQUID METAL
Lloyd P. Grobel, Schenectady, N.Y., assignor to General Electric Company, a corporation of New York
Filed Dec. 26, 1962, Ser. No. 246,944
5 Claims. (Cl. 310—219)

This invention relates to an improved device for conducting electric current between stationary and rotating conductors on a dynamoelectric machine. More particularly, the invention relates to a "collector" using small quantities of liquid metal as the medium for transferring current between stationary and rotating portions of the collector, with provisions for conserving and protecting the liquid metal used.

As currents required for excitation of the field coils of large generators have increased, the problem of transferring current from a stationary exciter to the rotating field coil by means of the "collector" has become more difficult. This is due to the limited current density which can be tolerated in the conventional carbon brushes. Increased field currents therefore require larger surface area or contact area between the brushes and the rotating collector rings. Since the diameter of the collector rings cannot be increased appreciably due to limits on tangential rubbing speed, increased current carrying capacity can only be obtained, therefore, by lengthening the collector rings. This often creates problems of rotor balance, and other mechanical difficulties.

It is known that some liquid metals and their alloys or eutectics have good electrical conductivity, and suggestions have been made for transferring current through such metals between rotating and stationary conducting members. Although some such metals are relatively plentiful, such as mercury, and can be circulated through external purifying or cooling equipment in a continuous flow, other such metals, such as gallium, indium or thallium, which may be more suitable, are extremely rare and expensive. The quantity of such metals which would be required to fill the pipes of an external recirculating arrangement would be prohibitive in cost.

Since it is desired that minimum quantities of the liquid metal be utilized, such a collector must be designed with close clearances. Hence there is great difficulty in maintaining proper clearances under varying operating conditions, which include thermal expansion and contraction of members, and also changes in positon of the members under different conditions of loading.

Also large clearances between rotating and stationary portions of a liquid metal device can lead to cavitation at high speeds. Hence, the running clearances must be kept very small and maintained constant insofar as possible.

Another problem with the use of liquid metals is one of maintaining proper temperatures and/or protective atmospheres for metals which would be liquid at the operating temperatures of a collector. This may involve such considerations as the fact that the "liquid" metal is solid at ordinary room temperatures, and also the fact that a liquid metal, which may not be toxic or corrosive or oxidizing at normal room temperatures, may possess these qualities at elevated temperatures.

Accordingly, one object of the present invention is to provide an improved liquid metal collector using minimum quantities of such metal under controlled temperatures and atmospheres.

Another object is to provide a liquid metal collector with means for maintaining critical clearances between its members at the proper value.

Still another object of the invention is to provide an improved liquid metal collector which is particularly suitable for the use of rare or expensive metals as the conducting medium.

Figure 2:
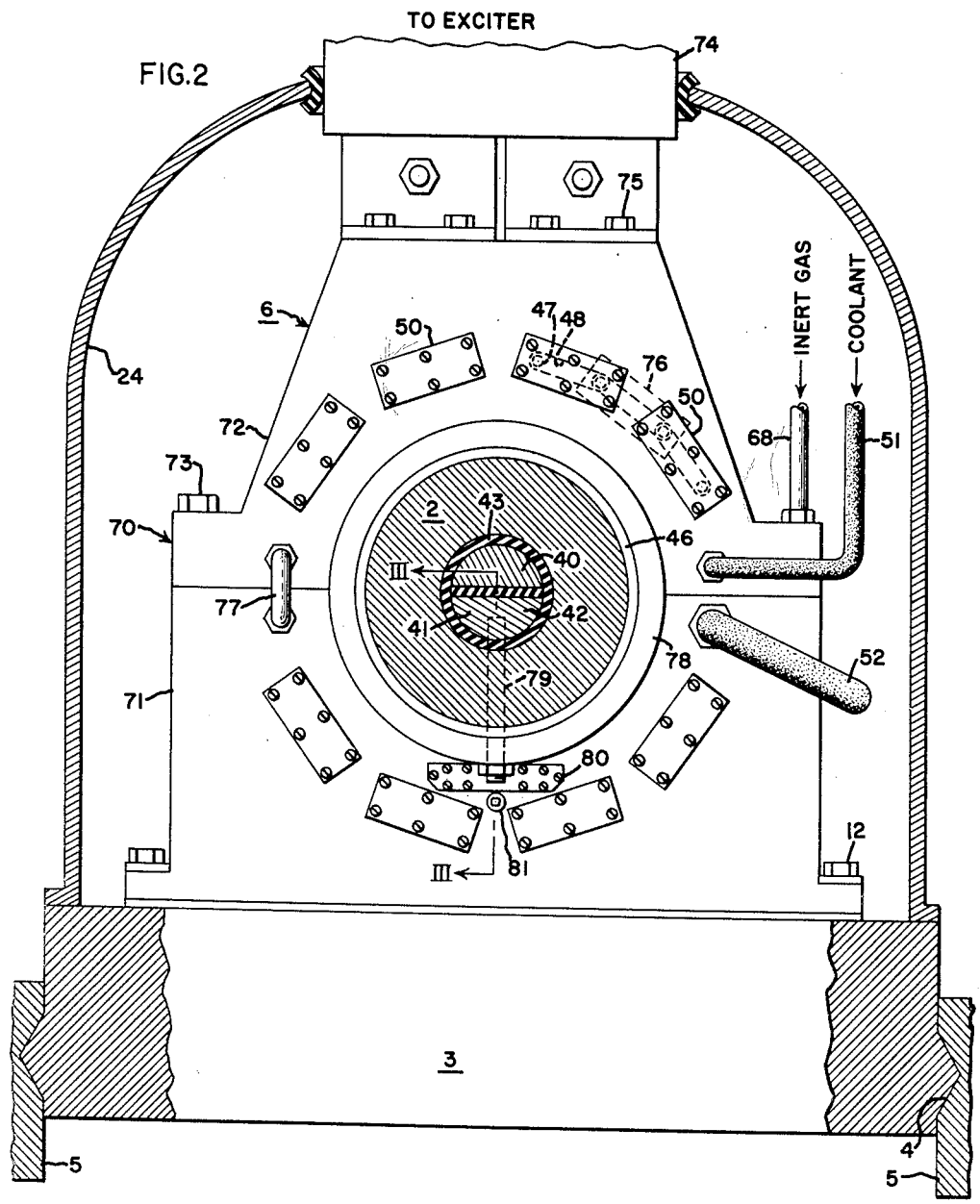
Figure 3:
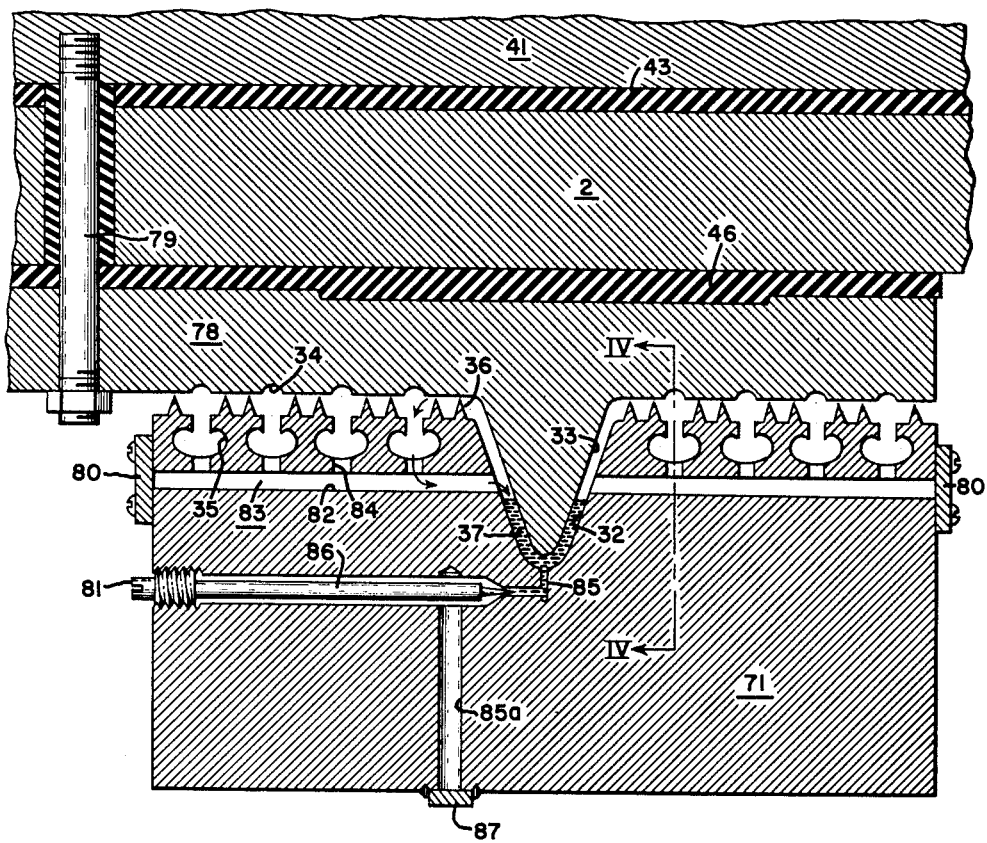
Figure 4:
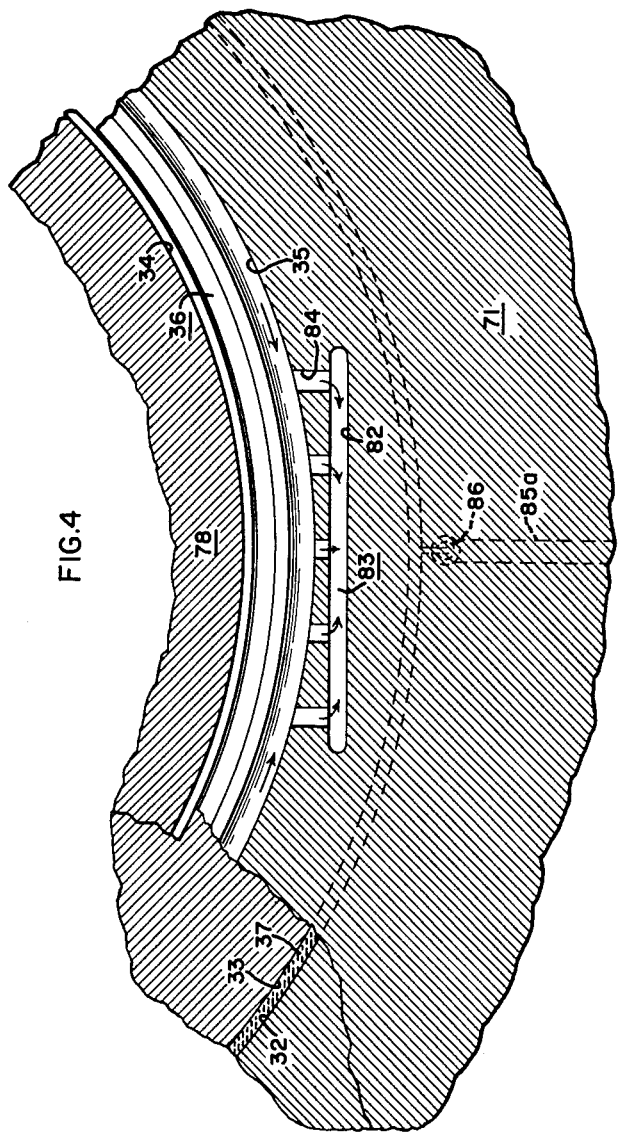
Figure 5:
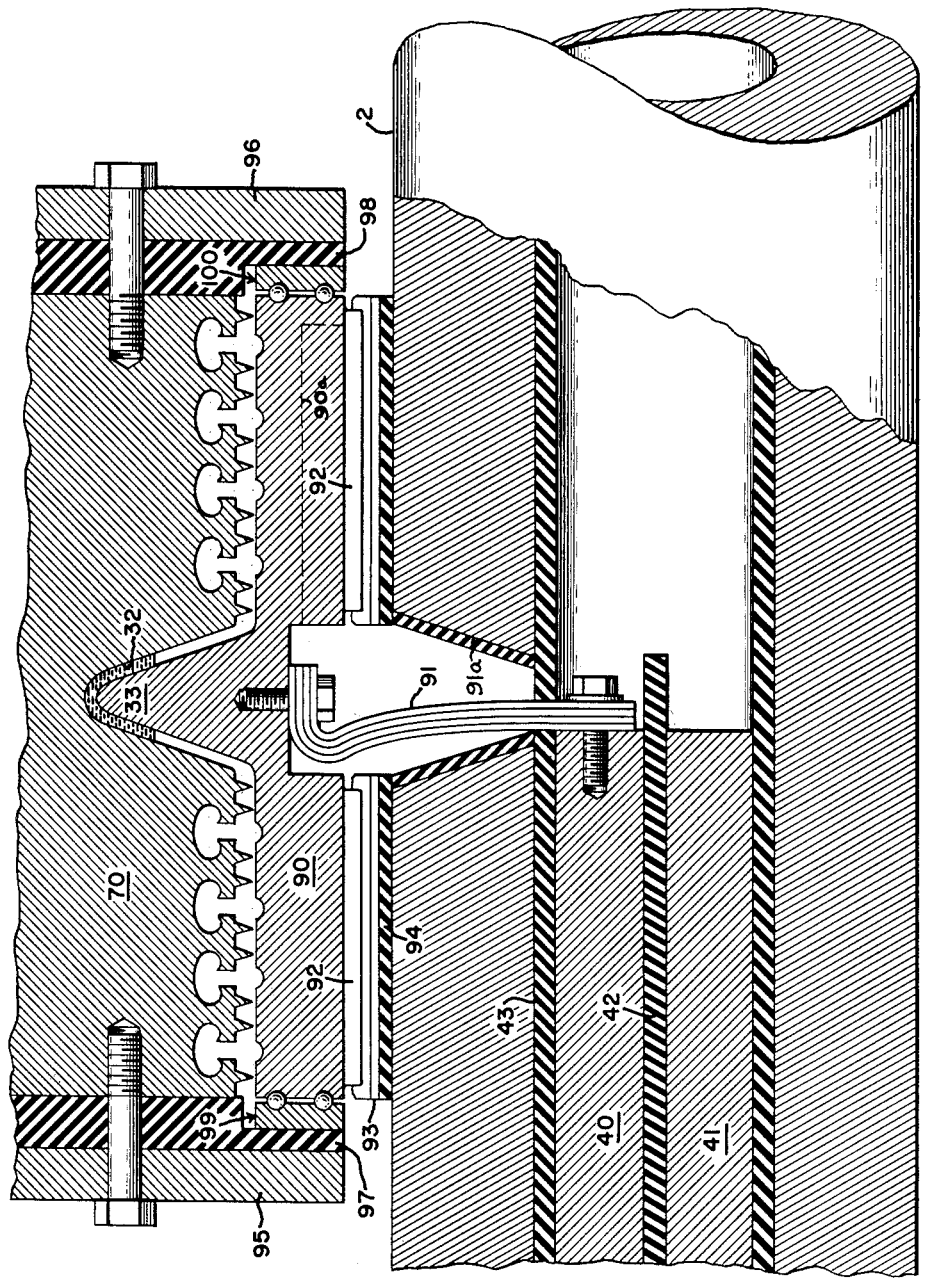

The subject matter which is regarded as the invention is particularly pointed out and distinctly claimed in the concluding portion of the specification. The invention, however, both as to organization and method of practice,. together with further objects and advantages thereof, may best be understood by reference to the following description taken in connection with the accompanying drawings in which:

FIG. 1 is a horizontal elevation view, partly in section, of a liquid metal collector assembly with accessory units indicated in schematic form, FIG. 2 is an end view of the collector assembly, taken along lines II—II of FIG. 1, FIG. 3 is an enlarged elevation view, in section, of the lower portion of a collector element, taken along lines III—III of FIG. 2, FIG. 4 is a still further enlarged cross-sectional view, looking in an axial direction along lines IV—IV of FIG. 3, and FIG. 5 is an elevation view, in section, of a collector element, according to a modified form of the invention.

Briefly stated, the invention is practiced by employing collector elements having conducting rotors and stators. The rotor is provided with a radial circumferential flange, which fits with close clearances inside a circumferential trough in the stator. The collector element includes a rotating seal cooperating with a reservoir within the stator to collect the liquid metal. Means are provided for maintaining axial clearances with a thrust bearing, and for maintaining a temperature and protective atmosphere suitable for the liquid metal employed.

Referring now to FIG. 1 of the drawing, the collector assembly shown generally as 1 is disposed on a shaft 2 of a dynamoelectric machine rotor. Shaft 2 would be, in the case of a turbine generator, an integral portion of the rotor (not shown) which carries field windings to be supplied with D.-C. excitation current from a stationary exciter (also not shown). Collector assembly 1 is mounted on a bedplate 3, which is arranged to slide axially within dovetail groove 4 in a stationary supporting structure 5. The major components of collector 1 are a collector element 6 of one polarity, and a second collector element 7 of the opposite polarity, disposed within a collector housing 8, and a thrust bearing arrangement 9 disposed in a thrust housing 10. The collector housing 8 and thrust housing 10 are secured together by means such as an annular bolted connector 11. Both collector elements 6, 7 and thrust housing 10 are also rigidly connected to bedplate 3 by means such as bolts 12, 13.

Thrust bearing 9 may be of any conventional type, and, as shown here, comprises a shaft-mounted thrust ring 14, secured against a shoulder 15 on shaft 2 by means of a threaded ring 16. Forming close clearances with thrust ring 14 are segmented thrust shoes 17, 18 having bearing metal surfaces 17a, 18a respectively, and axially spaced by means of a ring 19. Supporting annular end walls 20, 21 and an annular outer wall 22 complete the thrust housing. End wall 20, 21 of the thrust bearing include oil collection grooves 20a, 21a communicating with other oil collection conduits 19a in ring 19, and also communicating with a lubricant discharge pipe 23. Lubricant is supplied to thrust ring 14 by passages such as 18b in shoes 18. Many other types and arrangements of thrust bearings could be used in lieu of the specific arrangement illustrated in the drawing.

Referring now to the collector housing 8, it is seen to comprise a U-shaped outer wall 24 (see also FIG. 2) attached by bolts 25 to the thrust housing wall 20 on one end and attached to an end wall 26 on the other end. Wall 26, which may be split along the shaft centerline for ease of assembly, defines a central aperture 26a provided with a rotating seal 27. End walls 20, 26 and outer wall 24 together define a relatively gas-tight chamber 28, in which are disposed the collector elements 6, 7. The details of the collector elements will be described by reference to the cross-sectional portion of collector element 7, details of the two elements being essentially the same.

A collector stator 30 is disposed around a collector rotor 31 so as to form close clearances therewith. Stator 30 defines an annular V-shaped trough 32, and the rotor defines an annular V-shaped flange 33 nested within trough 32, with a clearance on either side on the order of 10 to 40 mills, although clearances as great as 1/32 inch or more might also be used. On either side of flange 33 of the rotor 31 are a number of axially spaced grooves 34. Aligned with grooves 34, on either side of the trough 32, are axially spaced collecting grooves 35. A number of close-fitting sealing teeth 36 are disposed between each set of mating grooves 34, 35. Current is conducted through the liquid metal contained in the radially outer portion of trough 32, the metal being indicated by reference numeral 37.

Insulated exciter leads 38 enter chamber 28 through insulated and sealed openings 24a. The conductive portions 38a of exciter leads 38 are electrically connected to the collector stator 30 by means of bolts 39.

In order to conduct current from the rotor 31 to the field windings, collector leads 40, 41 of semicircular cross section are provided and are insulated from one another by insulation 42. Leads 40, 41 are also insulated from shaft 2 by means of an insulating tube 43, extending axially along the shaft 2 inside a bore hole 2a. As shown in cross section, rotor 31 is electrically connected to lead 40 by means of a conducting bolt 44 insulated from shaft 2 by means of an insulating tube 45. It will be understood that rotor 31 is electrically connected to lead 40 by several of such bolts, and also that the rotor of the other collector element 6 is similarly electrically connected to lead 41.

It should also be mentioned that the rotor 31 is attached so as to rotate with shaft 2. This is normally accomplished by shrinking the rotor onto shaft 2 around an insulating tube 46. In other words, both collector elements 6, 7 are electrically insulated from the shaft in normal practice.

In order to provide temperature control of the liquid metal, pipes and hoses are provided for recirculating a coolant fluid through the stator members of the collectors. A number of axial holes 47 are circumferentially spaced around the stator, and serially connected at the ends by means of recesses 48, 49 covered by end plates 50.

A series flow arrangement of coolant is preferably used for collectors 6, 7, with insulating hoses being employed to insulate the collectors from one another and from ground. In the embodiment shown, an insulating inlet hose 51 supplies collector element 6, whereupon the liquid flows back and forth through the stator of member 6 in zigzag fashion to leave via insulating hose 52, which also serves as an inlet to collector member 7. After flowing through member 7, the liquid coolant leaves through a third insulating hose 53. An inlet pipe 54 connects with insulating hose 51 through a connection 55, which is grounded to the collector housing and similarly an outlet pipe 56 is connected to outlet hose 53 through a connection 57 at the housing.

The external temperature control system includes a coolant return pipe 58, with temperature indicating means 59, leading to a tank 60. A pump 61 returns the liquid to inlet pipe 54 from tank 60. It will be understood that the liquid coolant employed is also a dielectric, such as transil oil or extremely pure deionized water. By this means, there will be no flow of leakage currents through the liquid between collector elements 6, 7 or to ground.

During operation, heat will be generated due to ohmic and frictional losses in the liquid metal. Means for cooling the recirculating coolant in tank 60 are illustrated symbolically by cooling coils 62. During standstill, some metals, particularly gallium, may actually be in a solid state at room temperature when the machine is not in operation. For this reason, heating coils 63 are also provided to liquefy the collector metal before starting operations.

Means are also provided to surround and protect the collector metal with a protective inert atmosphere to prevent corrosion and oxidation. A gas bottle 64, of suitable gas, such as nitrogen or helium, which would prevent oxidation of the liquid metal, is supplied by bottle 64. A pressure gage 65, and valve 66, are used to control the flow through an inlet pipe 67 so as to maintain a pressure slightly above atmospheric in the insulating hoses 68, 69 leading to collector elements 6, 7 respectively. The gas is allowed to leak out slowly between the stator and rotor of the collector members and out of the collector housing 8.

Reference to FIG. 2 of the drawing shows an end view of the collector element 6. The stator member 70 is split along a horizontal centerline and includes a rectangular base portion 71 fastened to bedplate 3 by bolts 12 and an upper section 72 attached to lower section 71 by means of bolts 73. Exciter lead 74 is electrically connected to the top of stator half 72 by means of bolts 75 (see also FIG. 1).

The liquid cooling circuit is indicated by a number of circumferentially-spaced plates 50 which close off the ends of axial conduits 47 (see FIG. 1). The ends of adjacent conduits 47 are connected by recesses 48 which are covered by plates 50. Alternate adjacent conduits 47 are covered by similar plates at the other end of stator 70 as indicated by dotted lines 76.

A suitable jumper pipe 77 is employed to prevent leakage at the junction of the stator centerline. The end of the rotor 78 may be seen and the electrical connection between rotor 78 and lower lead 41 is indicated by the bolt 79 in dotted lines.

As will be explained later in detail, a reservoir (not shown) in a lower part of the stator base 71 is covered by plate 80. A drain plug 81 is used for removing the liquid collector metal. The metal is inserted, for example, by removing the inert gas hose 68 and letting it flow in at this point.

The details of the rotor and stator members may be seen by reference to the enlarged cross sectional view of FIG. 3, which is taken along section lines III—III. Similar members are designated with the same reference numerals as were used in FIGS. 1 and 2 of the drawings. In the detailed view, it will be seen that the annular V-shaped flange on the rotor fits closely within annular V-shaped groove 32 of the stator to define a U-shaped circumferential cavity for holding the liquid metal 37. Rotation of flange 33 shears the metal 37, and surface friction drags it partially with the flange until at high speeds the metal is maintained by the combined action of surface friction and centrifugal force in the radially outer portion of groove 32. For gallium, I employ an included angle of 36° for both flange 33 and groove 32.

Extending across a portion of the lower half of the stator 71 is a cavity 82, which is covered at either end by endplates 80 (see also FIG. 2), which forms a liquid metal collecting reservoir 83. When rotor 78 is at standstill, the liquid metal 37 drains to the lower half of the stator and flows into reservoir 83. It is to be particularly noted, however, that reservoir 83 is located so that it lies within the circular ring enclosed by the projection of the V-shaped trough 32, and radially inward of the normal "level" of liquid metal 37 when the rotor is at speed (see also FIG. 4). Hence, when the rotor commences turning, liquid metal 37 is always fed into the trough 32 from reservoir 83.

In order to return any metal leaking through the clearance gap between rotor and stator around teeth 36, a number of ports 84 connect annular collecting grooves 35 with the reservoir 83. Thus, metal leaking past the teeth will follow a circuit indicated by the arrows and will return to trough 32.

In order to conserve liquid metal 37 and to observe safety precautions to prevent losing any of it, a small drainage passage 85, controlled by a needle valve 86, is employed. The passage 85a, connecting with passage 85, drains liquid when needle valve is opened and is covered by a cap 87 which is welded to prevent loss of metal if plug 81 is opened inadvertently without intention to actually drain the unit.

A better understanding of the arrangement of reservoir 83 with respect to the other members may be had by reference to FIG. 4. As will be seen, the cavity 82 forming reservoir 83 is a flat slot, narrow in the radial direction, and having no part thereof radially inward of the collection grooves 35, and no part thereof radially outward of the working level of metal 37 in V-shaped trough 32. Hence, it can serve to receive leaking liquid from the collection grooves 35 and return this metal to trough 32. Also it can serve to receive and store liquid metal from the top part of trough 32 when the rotor is slowing down, or to supply liquid metal to the trough 32 when the rotor is coming up to speed.

A summary of the operation of the disclosed liquid metal collector is as follows: At standstill, the metal 37 in reservoir 83, which may be in a liquid or solid state, depending upon the chosen metal, may be pre-warmed by recirculating liquid from tank 60 (heated by coil 63 in the tank), which is pumped through the passages 47 in the collector stators. Upon reaching a suitable temperature, the shaft 2 may be rotated, and the V-shaped flange 33 will begin to drag liquid through surface friction from the lowermost part of the trough 32 around the periphery of the trough 32, additional liquid metal being supplied from reservoir 83 as this occurs. Previous to starting, an inert gas atmosphere may be supplied from gas bottle 64 through hoses 68, 69, which connect through conduits (not shown) with reservoir 83. As the shaft 2 comes to speed, centrifugal force will cause increased pressure in liquid metal 37, causing it to maintain good contact between the tip of flange 33 and the walls of trough 32. Thereafter, excitation current may be supplied through leads 38, 74, and current will flow across the full wetted surface between stator and rotor and from there to the field windings via collector leads 40, 41. As current densities are increased, heating of the liquid metal will occur and it will be found necessary to activate cooling coils 62 in tank 60 to carry off heat from the liquid being recirculated through the collectors 6, 7.

Differential thermal expansion of the rotor may cause the shaft portion 2 to move axially to a considerable degree. In keeping with the conservation of liquid metal and the prevention of cavitation in the liquid metal by using as small a clearance as possible between flange 33 and trough 32, the thrust bearing 9 serves to maintain this clearance in the following way. As the rotor shaft moves axially, the flange 33 on the collector ring and the thrust ring 14 move together, since they are both attached to the shaft. Thrust ring 14 serves to move thrust housing 10 along with it which, in turn, moves bedplate 3 along dovetail grooves 4. The bedplate movement also moves the attached collector stators, so as to maintain uniform clearance between flange 33 and trough 32. The flexibility of pipes 56, 67, 54, connected to the collector housing and the flexibility of exciter leads 38, 74, absorb this slight movement of the collector assembly with respect to external stationary members.

Any slight leakage of metal (due to irregular motions thereof in trough 32) which is not prevented by teeth 36 will enter annular grooves 35 and drain to reservoir 83 by way of ports 84 to return to trough 32.

Upon stopping the rotor shaft, liquid metal 37 will run to the bottom of trough 32 and then spill over into reservoir 83 whereupon it is conserved there for reuse.

A modification of the invention may be seen by reference to FIG. 5, wherein the thrust bearing acts on the collector rotor rather than on the collector stator. Therefore, instead of the collector stator being caused to move with the shaft, the collector rotor is caused to remain stationary when the shaft moves. Similar elements of the modification of FIG. 5 are designated with the same reference numerals as were used for the preferred embodiment of FIGS. 1–4, new reference numerals being used for the particular elements peculiar to this modification. The collector stator 70 is similar to the one previously shown, but the collector rotor, designated as 90, is modified slightly. Collector rotor 90 is electrically connected to lead 40 in the bore hole by means of flexible conductive leaf members 91, which are a stack of flat copper leaves disposed so as to be flexible in an axial direction. The inner diameter of collector rotor 90 is fitted with internal spline teeth 92. An externally splined cylinder 93 is attached to rotate with shaft 2, such as by a shrink fit, and is insulated therefrom by an insulating tube 94. Thus, collector rotor 90 is free to slide axially on shaft 2 while being constrained to rotate therewith. A tapered hole 91a extends through cylinder 93, insulation 94, shaft 2, and insulation 43 to receive the flexible lead 91. Slot 90a in the rotor is provided to receive the leaves 91 during assembly.

Axial movement of collector rotor 90 in either direction is prevented by means of end plates 95, 96, bolted to collector stator 70 and insulated therefrom by plates 97, 98. Suitable thrust bearings 99, 100 allow collector rotor 90 to rotate while being constrained from moving axially by means of plates 95, 96. Thrust bearings 99, 100 are shown in very simplified form as ball bearings, but in actuality would be more elaborate with provisions for lubrication, etc. Shoe-type thrust bearings as in FIG. 1 might also be used.

Thus the thrust bearings 99, 100 prevent the movement of collector rotor 90 with respect to collector stator 70. This maintains uniform clearance between flange 33 and groove 32, as before. Sliding movement of the collector rotor 90 with resect to shaft 2 is allowed by the spline teeth 92, the axial movement being absorbed by the flexible connector 91. The collection rings and operation of the liquid reservoir in the bottom of stator 70, as well as the details of recirculating liquid, are as previously described.

It will be seen that by virtue of the construction of the disclosed liquid metal collector assembly, a very tiny amount of liquid metal, which may be extremely rare and expensive, can be employed. The temperature of the liquid metal can be controlled by means of the liquid coolant recirculation through the collector stators. Oxidation of the collector metal, which might impair its conductivity, is prevented by means of the inert gas which blankets the metal and seeps from the collector housing in a slow but steady stream. The rotating clearance between rotor and stator can be additionally made very small to reduce or prevent cavitation, since the thrust bearings maintain its clearance constant despite axial movements of the shaft.

While there has been described what is at present considered to be the preferred embodiment of the invention, and one modification, various other modifications will occur to those skilled in the art, and it is desired to cover by the appended claims all such modifications as fall within the true spirit and scope of the invention.

What I claim as new and desire to secure by Letters Patent of the United States is:

1. A liquid metal collector comprising:
   a rotating shaft subject to axial movements,
   a collector rotor comprising a cylindrical conductive ring disposed on the shaft to rotate therewith and also insulated therefrom, said ring defining a radially extending V-shaped flange,
   a conductive collector stator disposed about said rotor and defining a bore having a circumferential V-shaped trough forming close clearances with said flange, a quantity of electrically-conductive liquid metal disposed between the flange and trough and held in the radially outermost portions of the trough by pumping action of the flange, sealing means for preventing leakage of said liquid metal axially between the rotor and stator, said stator defining a liquid reservoir in a lower portion thereof disposed radially inward of the liquid metal level when the rotor is at a selected speed and communicating with said trough, first conductor means electrically connected to the stator, second insulated conductor means disposed in said shaft and electrically connected to the collector rotor, whereby current flow may be established from the first conductor means to the second conductor means through the liquid metal, and thrust bearing means arranged to maintain the clearance between said V-shaped flange and trough substantially constant when the shaft moves in an axial direction.

2. The combination according to claim 1 wherein said liquid sealing means includes a plurality of axially spaced circumferential grooves defined by said stator bore on either side of said V-shaped trough, said collecting grooves being connected to said reservoir in the bottom of the stator, so as to return axially leaking liquid metal to the trough via the reservoir.

3. The combination according to claim 1 including a plurality of interconnected passages defined by said stator, a liquid recirculating system including a pump circulating dielectric liquid through said passages, and insulating hose means connecting said recirculating system with said passages for electrically isolating the liquid recirculating system from the collector stator.

4. A liquid metal collector comprising:

a rotating shaft subject to axial movements and defining a central bore hole, first and second axially spaced collector rotors comprising insulated conductive metal rings disposed around said shaft and attached to rotate and to move axially therewith, each of said collector rotors defining a radially extending V-shaped flange, first and second axially spaced conductive collector stators disposed about said first and second rotors respectively and defining annular V-shaped troughs forming close clearances with said flanges, first and second separate quantities of electrically conductive liquid metal disposed between the flange and groove of each rotor and stator respectively and held in the radially outermost portions thereof by pumping action of the flanges, each of said stators defining a plurality of circumferential collecting grooves on either side of its V-shaped trough, said collecting grooves being connected together by a reservoir defined in the lowermost portion of each stator and also communicating with the V-shaped groove at a radial location intermediate the tip and base of said rotor flange, first and second insulated conductor means electrically connected to the first and second stator respectively, third and fourth insulated conductor means disposed in the bore hole of said shaft and electrically connected to the first and second collector rotors respectively, said stators each defining a plurality of interconnected liquid coolant passages, external liquid coolant recirculating means circulating dielectric liquid through said passages, said recirculating means including a plurality of insulated hoses connected to and between said stator coolant passages, substantially gas-tight housing means surrounding the first and second stators and having rotating seals cooperating with the shaft, means for introducing a selected gas to said housing means to prevent oxidation, a collector assembly support member arranged to slide axially, thrust bearing means attached to move said collector assembly support when the shaft moves, and insulated means connecting the first and second stators to said support member, whereby axial clearances between the stator and rotor are maintained substantially constant.

5. A liquid metal collector comprising:

a collector rotor including a cylindrical conductive member having a V-shaped circumferential flange thereon, a conductive collector stator disposed about said rotor and defining an annular circumferential V-shaped trough forming close clearances with said flange, a quantity of electrically conductive liquid metal disposed between the flange and trough and held in the radially outermost portions thereof by pumping action of the flange, at least one circumferential collecting groove defined by the stator on either side of said V-shaped groove and having a lesser radius than the V-shaped groove, a liquid reservoir defined in a lower portion of said stator at a location radially outward of said collecting grooves and radially inward from the metal in the V-shaped trough, and conduit means connecting said collecting grooves with said reservoir and also connecting said reservoir with the V-shaped groove, whereby said reservoir serves to hold liquid metal when the rotor is not rotating, and also serves to return metal collected in the collecting grooves to the V-shaped trough.

References Cited by the Examiner
UNITED STATES PATENTS

| | | | |
|---|---|---|---|
| 2,044,180 | 6/36 | Newton | 219—59 |
| 2,845,554 | 7/58 | Schwab et al. | 310—178 |

MILTON O. HIRSHFIELD, *Primary Examiner.*